Patented Nov. 19, 1946

2,411,169

UNITED STATES PATENT OFFICE 2,411,169

ISOLATION OF DEHYDROCHOLIC ACID

Robert H. Sifferd, Brookfield, Ill., assignor to Armour and Company, Chicago, Ill., a corporation of Illinois No Drawing. Application July 22, 1944, Serial No. 546,221

6 Claims. (Cl. 260—397.1)

This invention relates to the isolation of dehydrocholic acid, and more particularly to the purification of impure dehydrocholic acid present in mixtures containing a substantial or predominant proportion of dehydrocholic acid.

Dehydrocholic acid is usually prepared by the oxidation of cholic acid. Even under the most efficient reaction conditions and processes, the purity of the dehydrocholic acid is found to be in the neighborhood of 95% to 99%, and in many methods of preparation the purity of the dehydrocholic acid will be very much lower. The impure dehydrocholic acid usually contains such materials as unchanged cholic acid, intermediate oxidation products, and pigments.

The isolation of substantially pure dehydrocholic acid from impure mixtures of the same has heretofore presented many difficulties. Various efforts have been made to purify dehydrocholic acids, but the processes have been inefficient and relatively unsatisfactory. Among the efforts which have been made to purify dehydrocholic acids are various crystallizing processes. However, in the crystallizing and recrystallizing of dehydrocholic acids with the ordinary and usual solvents, many difficulties are encountered. Dehydrocholic acid is too soluble in some solvents so that although it may be dissolved it cannot be readily precipitated or crystallized. In other solvents, the dehydrocholic acid is not sufficiently soluble for recrystallization. Other solvents have been found to react with the dehydrocholic acid while still other solvents are too difficult to handle and control. Still another difficulty is that many solvents exert a solvent action on the impurities which is similar to the solvent action on the dehydrocholic acid, and separation is therefore difficult.

The present invention relates to the isolation of relatively pure dehydrocholic acid by crystallizing the same from an impure material with a class of solvents in which the process may be readily and economically carried out to produce a product of high purity.

The invention contemplates the crystallizing of dehydrocholic acid from tertiary alcohols, and particularly from aliphatic tertiary alcohols, such as tertiary amyl alcohol and tertiary butyl alcohol.

The tertiary alcohols do not react with the dehydrocholic acid and differ from the primary alcohols, for example, in that no substantial formation of esters of the dehydrocholic acid occurs. The dehydrocholic acid is only moderately soluble in tertiary alcohols at low temperatures, while at higher temperatures the solubility of the acid is much greater. Accordingly, the dehydrocholic acid may be readily dissolved at high temperatures and crystallized by lowering the temperature of the solution. The impurities, such as cholic acid and intermediate oxidation products of cholic acids, either do not dissolve in the tertiary alcohol or else are not precipitated from the tertiary alcohol by the lowering of the temperature.

In the process of the invention, the crude or impure dehydrocholic acid, such as the crude oxidation product obtained from the oxidation of cholic acid, may be well washed with water and then dissolved in the tertiary alcohol, preferably at a temperature near the boiling point of the alcohol. The solution may be filtered to remove any materials which have not dissolved, and then cooled to crystallize the dehydrocholic acid. The crystallized dehydrocholic acid may be separated from the solution by filtration.

The quantity of alcohol used should be the minimum quantity required to dissolve all of the dehydocholic acid present. When tertiary amyl alcohol, for example, is used, approximately eight to ten volumes of this alcohol may be used in dissolving the crude oxidation product.

Any suitable tertiary alcohol may be used, but aliphatic alcohols are preferred, and tertiary amyl alcohol and tertiary butyl alcohol have been found to be very satisfactory. In the case of tertiary amyl alcohol, the crude dehydrocholic acid may be dissolved at the boiling point of the alcohol or at a temperature in the neighborhood of 70° C.–90° C., while in the case of tertiary butyl alcohol the material may be dissolved at the boiling point of the alcohol or at a temperature in the neighborhood of 60° C.–80° C.

Specific examples of the process are as follows:

1. 100 pounds of crude dehydrocholic acids are dissolved by boiling with 125 gallons of tertiary amyl alcohol. The hot solution is filtered to remove undissolved impurities and then cooled to crystallize the dehydrocholic acid. The precipitated dehydrocholic acid is then separated from the solution by filtration.

2. 100 pounds of crude dehydrochloic acid are dissolved by boiling with 100 gallons of 95% aqueous tertiary butyl alcohol. The hot solution is filtered to remove undissolved impurities, and the purified dehydrochloic acid recovered by lowering the temperature of the solution to crystallize the same and separating the dehydrocholic acid by filtration.

3. 100 pounds of crude dehydrocholic acid are dissolved by boiling with 200 gallons of tertiary butyl alcohol. The hot solution is filtered to remove undissolved impurities. The solution is then cooled until the dehydrocholic acid is crystallized therefrom and the dehydrocholic acid is then separated from the cooled solution by filtration.

By means of this process, crude or impure dehydrocholic acid may be quickly, readily and economically purified by crystallization of the acid from a tertiary aliphatic alcohol. Although a single crystallization step will usually be effective, if desired additional recrystallizations may be carried out. In the case of crude dehydrocholic acid containing cholic acid, the cholic acid is readily separated since it remains in solution in the alcohol and the alcohol is cooled to crystallize the dehydrocholic acid. Because of the relatively high solubility of the dehydrocholic acid in the tertiary alcohols at temperatures near the boiling point of the alcohols in comparison with the moderate solubility of the acid in the alcohols at lower temperatures, the crystallization is extremely efficient.

Although the invention has been described in connection with certain specific embodiments, it will be apparent that modifications and changes may be made without departing from the spirit and scope of the invention.

I claim:

1. A process for isolating substantially pure dehydrocholic acid from a mixture containing a substantial proportion of the same, comprising dissolving the mixture in a tertiary aliphatic alcohol at a temperature in the neighborhood of the boiling point of the alcohol, separating the hot solution from any undissolved materials, lowering the temperature of the solution to crystallize therefrom the dehydrocholic acid, and separating the crystallized precipitate from the solution.

2. A process for isolating substantially pure dehydrocholic acid from a mixture containing a substantial proportion of the same, comprising dissolving the mixture in tertiary amyl alcohol at a temperature in the neighborhood of the boiling point of the alcohol, separating any undissolved materials from the hot solution, lowering the temperature of the solution to crystallize therefrom the dehydrocholic acid, and separating the crystallized precipitate from the solution.

3. A process for isolating substantially pure dehydrocholic acid from a mixture containing a substantial proportion of the same, comprising dissolving the mixture in tertiary butyl alcohol at a temperature in the neighborhood of the boiling point of the alcohol, separating undissolved materials from the hot solution, lowering the temperature of the solution to crystallize therefrom the dehydrocholic acid, and separating the crystallized precipitate from the solution.

4. A process for isolating substantially pure dehydrocholic acid from a mixture containing a substantial proportion of the same, comprising dissolving the mixture in tertiary amyl alcohol at a temperature in the neighborhood of 70° C.–90° C., separating any undissolved materials from the hot solution, lowering the temperature of the solution to crystallize therefrom the dehydrocholic acid, and separating the crystallized precipitate from the solution.

5. A process for isolating substantially pure dehydrocholic acid from a mixture containing a substantial proportion of the same, comprising dissolving the mixture in tertiary butyl alcohol at a temperature in the neighborhood of 60° C.–80° C., separating undissolved materials from the hot solution, lowering the temperature of the solution to crystallize therefrom the dehydrocholic acid, and separating the crystallized precipitate from the solution.

6. A process for treating a mixture containing a substantial proportion of dehydrocholic acid, comprising dissolving the mixture in a tertiary aliphatic alcohol at a temperature in the neighborhood of the boiling point of the alcohol, lowering the temperature of the solution to crystallize therefrom the dehydrocholic acid, and separating the crystallized precipitate from the solution.

ROBERT H. SIFFERD.